United States Patent [19]

Jovick et al.

[11] 4,090,592
[45] May 23, 1978

[54] WHEEL SPEED SENSOR FOR DRIVE AXLE

[75] Inventors: Raymond John Jovick, Troy; Roger James Malott, Union Lake, both of Mich.

[73] Assignee: Rockwell International Corporation, Pittsburgh, Pa.

[21] Appl. No.: 776,165

[22] Filed: Mar. 10, 1977

Related U.S. Application Data

[60] Continuation of Ser. No. 640,355, Dec. 15, 1975, which is a division of Ser. No. 575,159, May 7, 1975, Pat. No. 3,949,841.

[51] Int. Cl.² .............................................. B60T 8/08
[52] U.S. Cl. .................................. 188/181 R; 310/168
[58] Field of Search ................. 188/181 A, 181 R; 303/95, 97, 113; 310/168

[56] References Cited
U.S. PATENT DOCUMENTS

| | | | |
|---|---|---|---|
| 3,690,426 | 9/1972 | Weisgerber | 188/181 A X |
| 3,769,533 | 10/1973 | Pauwels | 188/181 R X |
| 3,790,227 | 2/1974 | Dozier | 303/20 X |

Primary Examiner—Duane A. Reger

[57] ABSTRACT

A wheel speed sensor for a wheel mounted on the end of an axle shaft of a drive axle can be utilized in an anti-wheel lock brake control system. The sensor includes an electromagnetic sensing device which is mounted on the drive axle housing in alignment with the axle shaft inwardly of the wheel. An excitor rotor of the sensor is preferably mounted on the differential casing about the axle shaft in alignment with the sensing device for rotation while maintaining the distance between the sensing device and the rotor within a predetermined limit without allowing contact therebetween. A C-shaped spring partially encircles the rotor as a pair of tabs at its ends extend inwardly through the rotor to make contact with a corresponding pair of grooves in the axle shaft. The C-shaped spring member drives the rotor in response to rotary movement of the axle shaft but allows removal of the axle shaft for maintenance while the rotor is retained within the protective interior of the housing.

4 Claims, 12 Drawing Figures

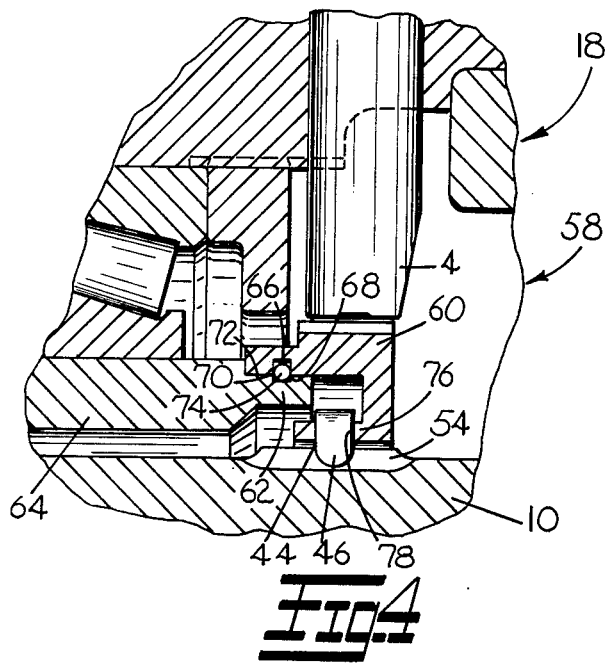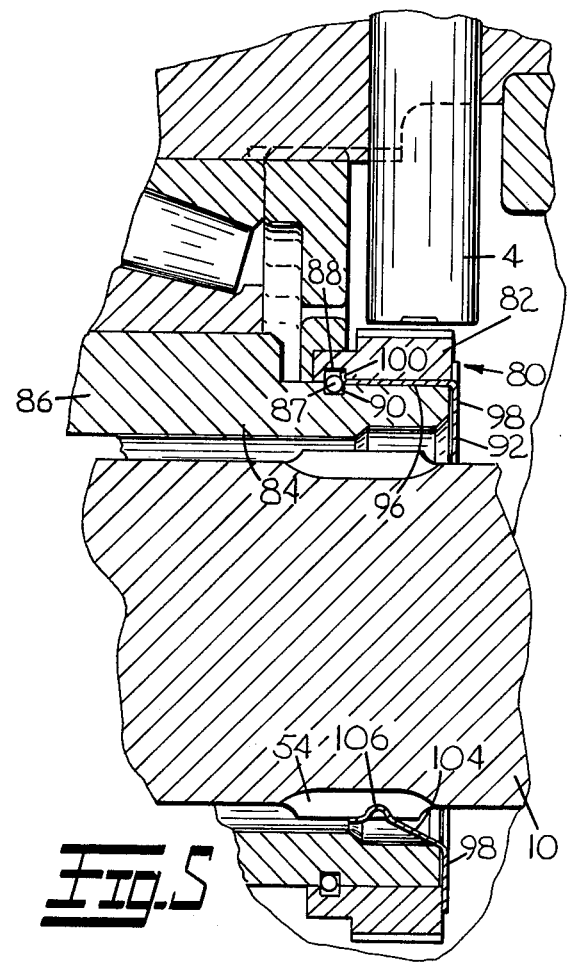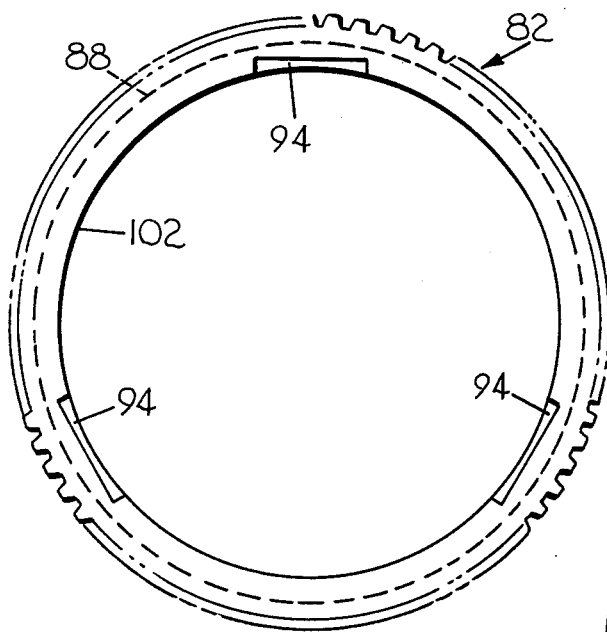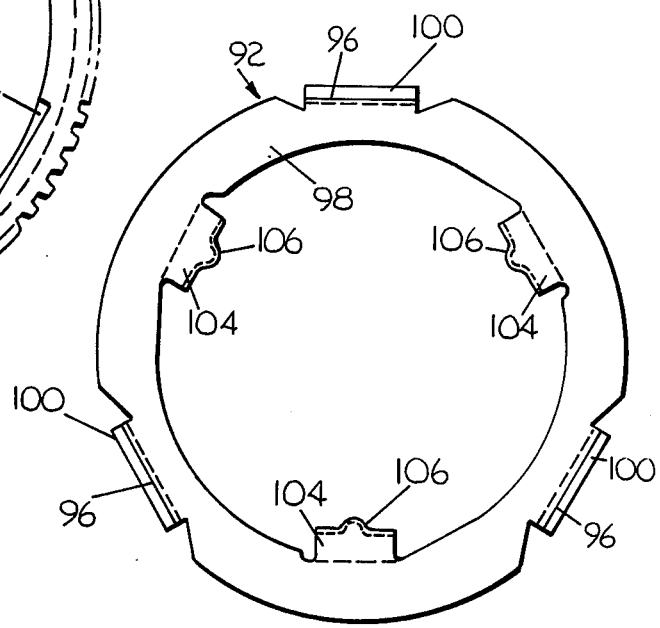
Fig.4
Fig.5
Fig.6
Fig.7

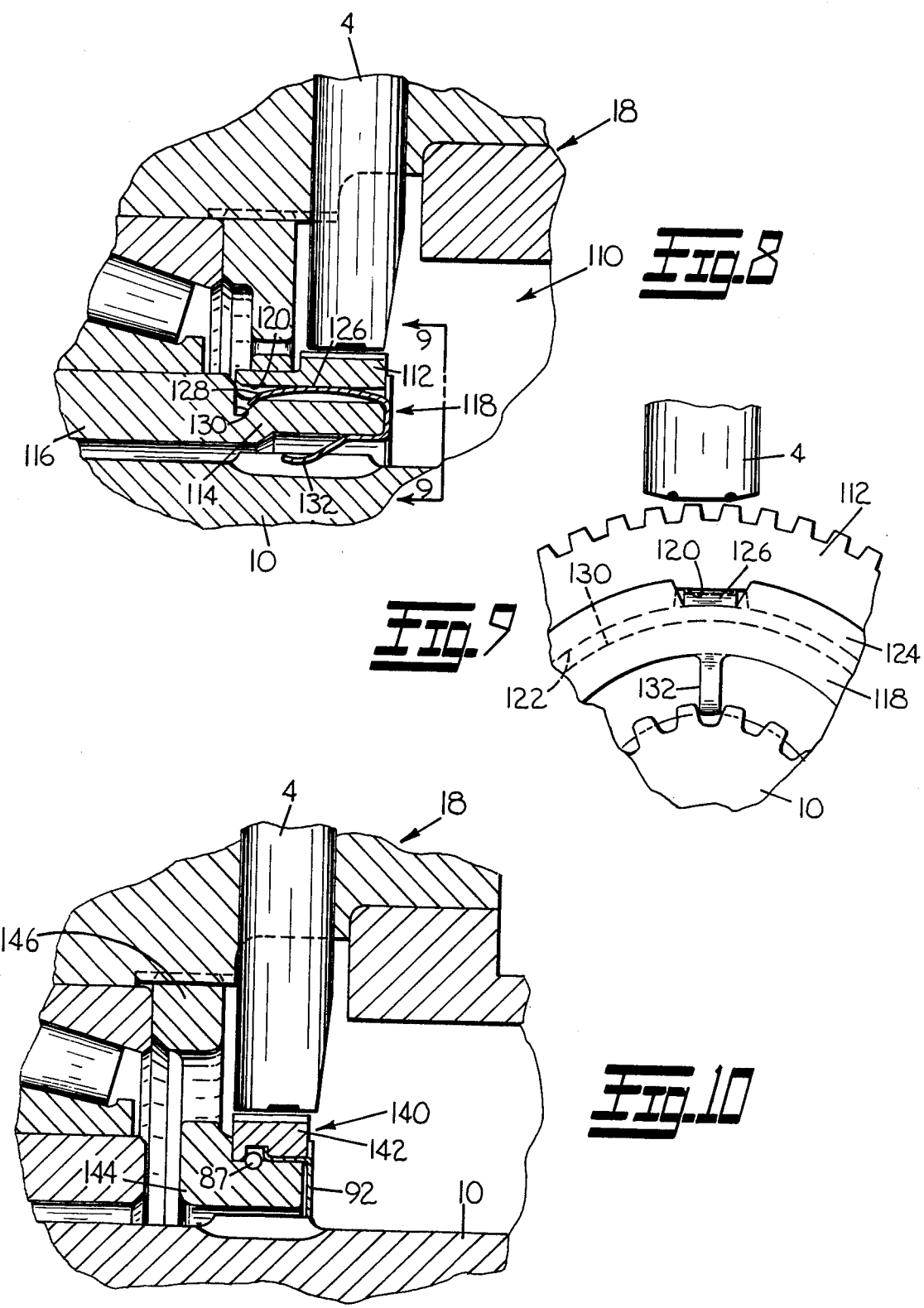

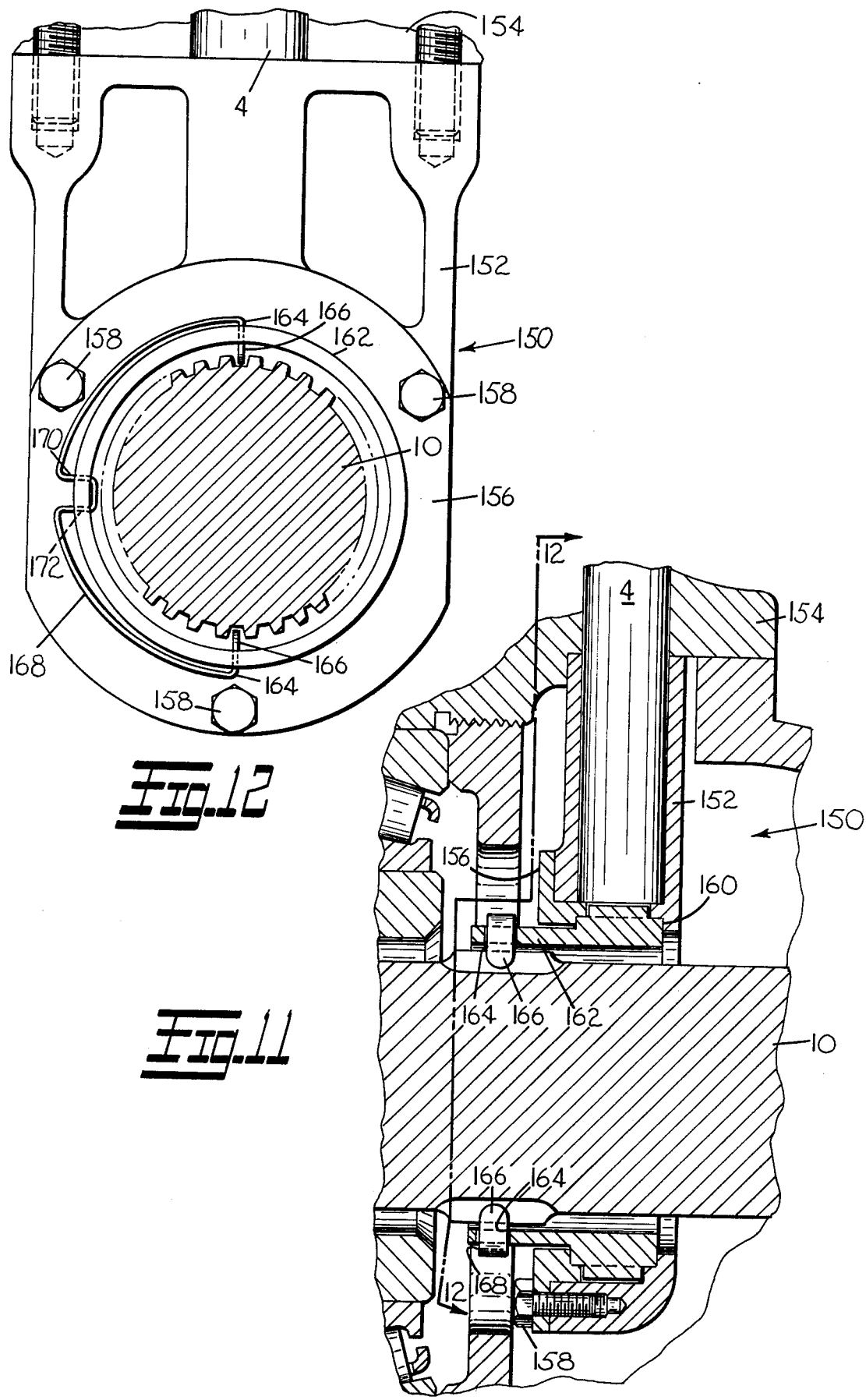

WHEEL SPEED SENSOR FOR DRIVE AXLE

This is a continuation, of application Ser. No. 640,355, filed Dec. 15, 1975, which is a divisional application of Ser. No. 575,159, filed May 7, 1975, now U.S. Pat. No. 3,949,841.

BACKGROUND OF THE INVENTION

1. Field of the Invention

This invention relates to a wheel speed sensor for a drive axle and, more specifically, to such a sensor which can be located inwardly of the wheel, for example, in the differential area and may be utilized in an anti-wheel lock brake control system. U.S. Pat. Nos. 3,743,362 and 3,790,227 are hereby incorporated by reference.

2. Description of the Prior Art

Modern anti-wheel lock brake control systems operate in response to electrical signals indicative of the angular velocity of one or more of the vehicle wheels. Usually these signals are derived from sensors which include an electromagnetic sensing device having at least one magnet and carried by a stationary portion of the vehicle such as the axle housing and a toothed or notched metal rotor which rotates in response to wheel rotation and is located opposite the sensing device. As the rotor teeth pass the electromagnetic sensing device, the resulting variations in flux produce a voltage, the frequency of which is a function of the angular velocity of the wheel and the number of teeth in the rotor.

To produce the required voltage level of the velocity signal, the sensing device and excitor rotor must be accurately located with respect to each other during initial assembly and must remain in this preselected relationship even after extended periods of operation in which the components are subjected to road shocks and repeated vibration. It is also essential that installation of the sensor assembly be accomplished in a manner adaptable to mass production methods to minimize the need for skilled technicians and elaborate installation techniques. It has heretofore been the general practice to provide wheel speed sensors for braking systems which are located in the wheel region. It has, however, been found that these sensors have caused some problems by their location at the wheel since care must be taken to prevent their damage during wheel maintenance.

Although, as shown in U.S. Pat. Nos. 3,138,970 and 3,769,533, consideration has been given to wheel speed sensors for drive axles which are located in the differential area of the axle, their acceptability has been limited. In these systems, a rotor is directly mounted to the axle shaft and the electromagnetic sensing device is mounted on the differential housing for extension therein in alignment with the rotor.

However, with improved anti-wheel lock brake control systems, better braking control and shorter stopping distances have been obtained when a higher number of teeth are used in the rotor, for example, 60 to 120 teeth. Increasing the number of teeth for better resolution of the system also requires that the distance between the sensing device and the rotor be minimized and places greater emphasis on maintaining this distance within predetermined limits throughout rotor rotation. This has been found to be significant with an anti-wheel lock brake system such as disclosed in U.S. Pat. Nos. 3,743,362 and 3,790,227, which are incorporated by reference herein. The system disclosed therein, for example, is an axle-by-axle system which includes for each axle a digital computer for controlling a high capacity valve which is capable of delivering maximum operating air pressure to both brakes on the axle. The computer logic automatically controls the valve so that it is capable of delivering only a proportion of the operating air pressure in an effort to keep the level of air pressure just below that at which either wheel will lock. The computer must rely on accurate wheel speed indication to be capable of making constant decisions at a rate of about 50 times a second on whether to increase or decrease air pressure, or maintain it at the same level. Because the system is capable of proportioning the air pressure rather than being limited to simply turning it fully on or off as was the practice in many systems heretofore utilized, it produces a smoother, controlled stop in shorter distances.

Mounting a rotor directly to an axle shaft, as taught by the prior art discussed hereinabove, has generally been found for several independent reasons to be incapable of satisfying the requirements of these improved systems. Firstly, the normal manufacturing tolerances for an axle shaft and the designed "float" allowed for the side gears of the differential will not insure a sufficiently accurate rotor location with respect to the portion of the drive axle housing on which the sensing device has been mounted. Without redesigning to eliminate the "float" and/or without significantly decreasing the tolerances of the axle shaft during its manufacture, the portion of the shaft to which the rotor is secured can be inaccurately aligned with the housing so that the axle shaft will move transversely within the housing during its rotation.

Additionally, since during initial installation the axle shaft must be physically inserted into the differential through the interior of the drive axle housing, potential damage to the rotor mounted thereon is possible by its accidentally making contact with the interior. This potential damage to the rotor during installation also exists each time the axle shaft must be removed for maintenance purposes.

Further, since the end of the housing adjacent the wheel area has an inside diameter only slightly larger than the outside diameter of the axle shaft, the size of the rotor is also limited if it is permanently and directly mounted thereon thus limiting the number of teeth that can be utilized for improving system resolution.

Still further, the fact that the axle shaft is sometimes removed for maintenance presents another reason, perhaps as significant as any presented hereinabove, for not having the rotor permanently mounted on the axle shaft. When the rotor is no longer protected by the housing and is generally exposed to the environment of a maintenance area, damage to the surface or teeth of the rotor is a significant possibility which could seriously affect the operation of the wheel speed sensor when it is reinstalled.

SUMMARY OF THE INVENTION

It is therefore an object of the present invention to provide a wheel speed sensor for a drive axle which may be located inwardly of the wheel area, as, for example, in the differential area.

It is another object of the present invention to provide a wheel speed sensor of the type described which is simple to install and which will not be susceptible to damage during wheel or axle maintenance.

It is a further object of this invention to provide a wheel speed sensor of the type described in which the rotor is mounted for rotation in response to rotation of the axle shaft without being directly mounted thereon prior to axle installation.

It is still another object of the invention to provide a wheel speed sensor of the type described in which the misalignment of the axle shaft will not interfere with efforts to maintain a predetermined space between the rotor and the sensing device.

It is still a further object of the invention to provide an anti-wheel lock brake system which utilizes a computer to control a valve to provide proportional amounts of air pressure to both brakes of a drive axle to prevent either wheel from locking, wherein the computer receives wheel speed indication for this purpose from each of a pair of sensors mounted adjacent the differential mechanism of the drive axle.

BRIEF DESCRIPTION OF THE DRAWINGS

FIG. 4 is a fragmentary sectional view of an alternative embodiment of the invention.

FIG. 5 is a fragmentary sectional view of another alternative embodiment of the invention.

FIG. 6 is a side view of the rotor of the embodiment shown in FIG. 5.

FIG. 7 is a side view of the drive spring of the embodiment shown in FIG. 5.

FIG. 8 is a fragmentary sectional view of yet another alternative embodiment of the invention.

FIG. 9 is an end view of the drive spring for the embodiment shown in FIG. 8.

FIG. 10 is a fragmentary sectional view of still another alternative embodiment of the present invention.

FIG. 11 is a fragmentary sectional side view of one more alternative embodiment of the present invention.

FIG. 12 is an end view of the embodiment shown in FIG. 11 as seen along line 12—12.

DETAILED DESCRIPTION OF THE PREFERRED EMBODIMENTS

Figure 1:
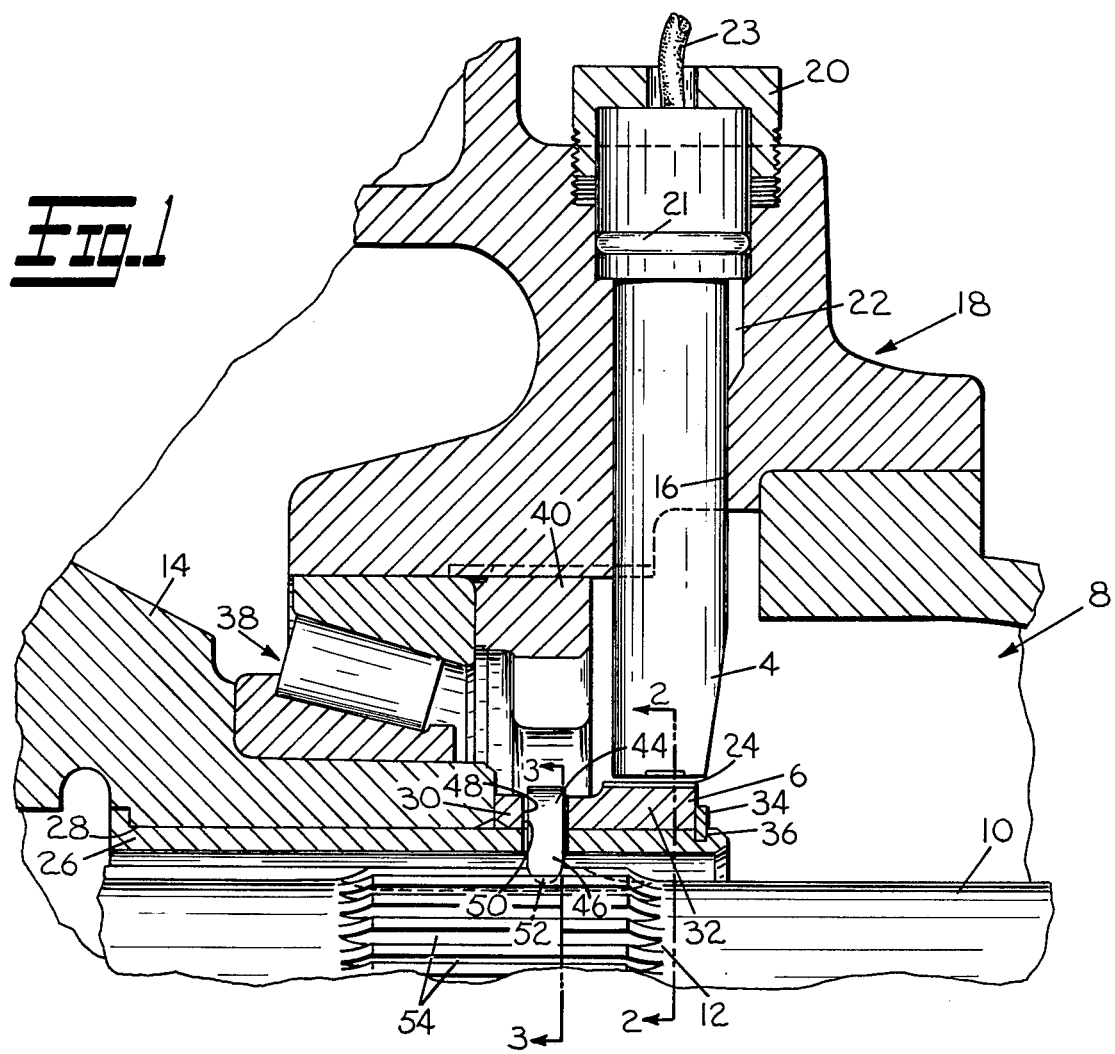
FIG. 1 is a fragmentary sectional view of the preferred embodiment, including various features of the invention.

As seen in FIG. 1, a wheel speed sensor 2 includes an electromagnetic sensing device 4 and an excitor rotor 6 which are located on a drive axle 8 of a vehicle. The sensor 2 as shown in the preferred embodiment is located remotely of the wheel (not shown), which would be to the right as viewed, and adjacent a differential mechanism (only partially shown), which would be to the left. More specifically, the sensor 2 is shown at an axle shaft 10 in general alignment with a portion 12 thereof, which is adjacent the end of the differential casing 14. There would, of course, be two sensors, one for each axle shaft and wheel, in an anti-wheel lock brake system like that discussed hereinabove.

The sensing device 4 extends through a cavity 16 of the drive axle housing 18 where an appropriate retaining means 20 and sealing means 21 maintains its location through operation and insures oil within the housing 18 will not be lost. A key 22 of sensing device 4 is received within the cavity 16 to insure proper alignment and prevent rotation of the sensing device 4. Electrical wiring 23 transmits a signal from the sensing device 4 for use in an anti-skid braking system or any other speed indicating system as desired.

The rotor 6 includes a plurality of teeth 24 which are disposed to pass by the sensing device 4 so that it may generate the signal indicative of speed. The rotor 6 is mounted for this purpose on a sleeve member 26 which is in turn mounted within a cavity 28 of the differential casing 14. The cavity 28 is adapted to receive the axle shaft 10 so that the sleeve member 26 and rotor 6 will generally rotate about the axle shaft 10. The rotor 6 is maintained axially on the sleeve member 26 by an inward end 30 making contact with the differential casing 14 and the outward end 32 resting against a snap ring 34 which is retained within a circumferential groove 36 of the sleeve member 26. Since the differential casing 14 is mounted for rotation within the housing 18 at bearings 38 held in position by an adjusting nut 40, its general axis of rotation A will be relatively fixed with respect to the housing 18. Accordingly, the axis of rotation of the rotor 6 will be disposed with respect to the rigidly mounted sensing device 4 to maintain a predetermined distance therebetween. During the manufacturing of the various elements discussed hereinabove, the general tolerances normally maintained will result in a predetermined distance between the sensing device 4 and the rotor 6 which is within the desired operating limits to insure accurate speed indication.

Figures 2, 3:
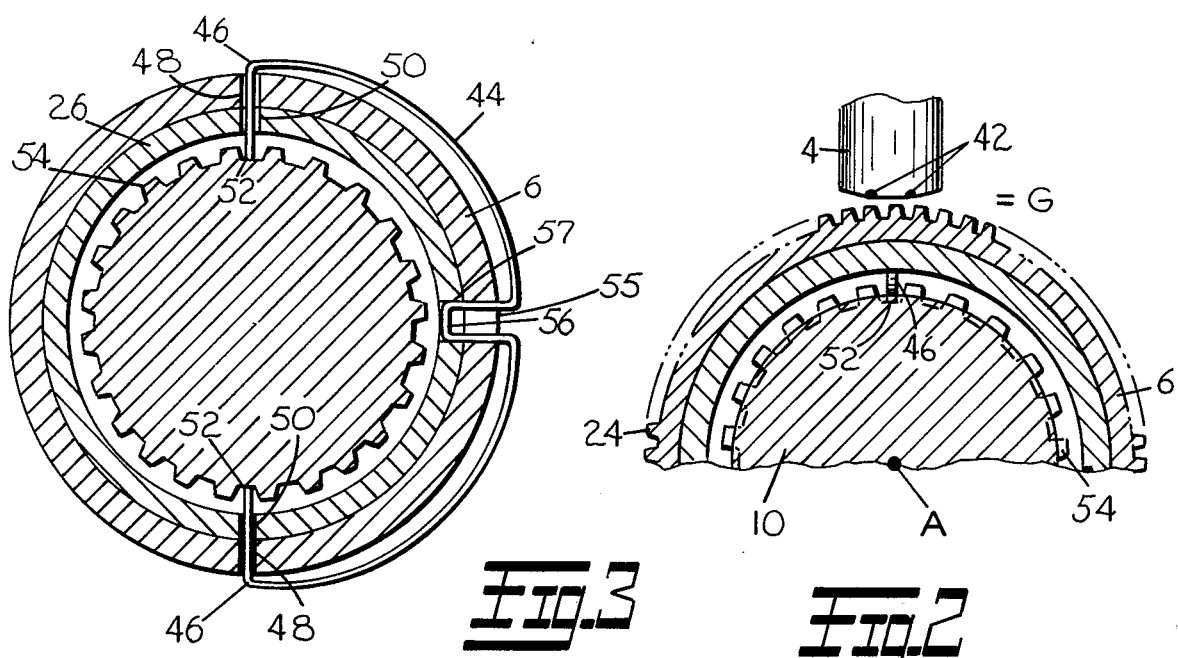
FIG. 2 is a view as seen along line 2—2 of FIG. 1.
FIG. 3 is a view as seen along line 3—3 of FIG. 1.

Referring additionally to FIGS. 2 and 3, the preferred rotor 6 includes 60 teeth 24 which are to pass by a pair of sensing elements 42. The gap G between the teeth 24 and the elements 42 should be about .030 inches and no greater than 0.040 inches as the rotor 6 rotates about the axis of rotation A of the differential casing. However, the general manufacturing tolerances of the axle shaft and the general tolerances between the side gear (not shown) and the pinion gear (not shown) of the differential (not shown) will not insure that a gap of less than 0.040 inches can be maintained if a rotor is mounted directly on the axle shaft. The axle shaft may be sufficiently misaligned during operation to transversely move toward and away from the housing to either undesirably alter the speed signal or to cause destructive contact between the rotor and the sensing device. However, the means of mounting disclosed herein for the present invention prevents either of these occurrences.

To provide a means whereby the rotor 6 will rotate in response to rotary movement of the axle shaft 10 but will be unaffected by any transverse movement thereof, a flexible drive means of the preferred embodiment is in the form of a C-shaped spring 44. The C-shaped spring 44 partially encircles the rotor 6 in a region which is remote from the teeth 24. The spring 44 includes at its opposite ends inwardly extending tabs 46. Each tab 46 is adapted to extend through aligned openings 48 and 50 of the rotor 6 and sleeve member 26, respectively. The inward ends 52 of the tabs 46 extend into a splined area 54 at the portion 12 of the axle shaft 10. The C-shaped spring 44 is therefore capable of compensating for misalignment of the axle shaft 10 with respect to the sleeve member 26 and rotor 6 which are themselves, as explained hereinabove, aligned with the housing 18. With even the most significant transverse movement of the axle shaft 10, both tabs 46 will be maintained within a groove of the splined area 54 because of the resilience of the spring 44. It has been found that slight movement of the inward end 52 of the tab 46 within the groove of the splined area 54 and slight movement of the tab 46 within the openings 48 and 50, which occurs when the axle shaft moves in a direction generally perpendicularly to the tabs 46, might interfere with rotor operation.

Accordingly, the indented portion 56 of the spring 44 has been included to be snugly received within aligned openings 55 and 57 of the rotor 6 and sleeve member 26, respectively. While the indented portion 56 allows the spring 44 to move in a direction perpendicularly of the tabs 46, it also restricts any rotation of the spring 44 about the tabs 46 and generally prevents relative rotational movement between the rotor 6 and the axle shaft 10 during operation.

There are a number of features found in the preferred embodiment of FIGS. 1, 2 and 3 and which may be found in other embodiments discussed hereinbelow which should be discussed for a clearer understanding of the invention. For example, as mentioned hereinabove, the interior of the housing 18 is filled with lubricating oil. Accordingly, it has been found that the sleeve member 26 has been provided sufficient lubrication to allow its rotation within the cavity 28 of the differential casing 14. It is also well known in the bearing art that the proper selection of compatible surface materials between members or the introduction of lubricating parts or passageways could further insure against wear if required. It should be noted, however, that the relative rotation of the sleeve member 26 with respect to the differential casing 14 only occurs when the differential mechanism is being utilized to allow one wheel to rotate at a different speed than the other. The location of the sleeve member 26 within the differential casing 14 therefore has in this preferred embodiment been chosen because of the minimum relative rotation therebetween which is expected during normal vehicle operation.

Although the rotor 6 is shown with teeth 24, it should be understood that other forms of rotors might be used. A plastic rotor, for example, could be used and might include a smooth outer surface with a plurality of metal bars encased therein to produce the electromagnetic force variations required for a speed signal.

Although a splined area which completely encircles the axle shaft 10 is shown, any reasonable alternative such as a single groove at each contact point or a pair of adjacent raised portions might be utilized to produce the same results.

Another significant feature of the preferred embodiment is better understood by a general explanation of the installation of the axle shaft 10 and its possible removal during maintenance. The drive axle housing 18 in most installations extends to the wheel area where it closely encircles the axle shaft 10. When the drive axle 8 is assembled, the differential mechanism is initially mounted within the housing 18. Each axle shaft 10 is then positioned through the small opening at the end of the housing 18 from the wheel end. The inward end of the axle shaft 10, which is splined, is then "threaded" through the opening in the differential casing 14 to be eventually received within the side gears of the differential mechanism. It can now be seen that the drive means of the preferred embodiment in the form of the C-shaped spring 44 accommodates this installation procedure. As the axle shaft 10 is moved axially past the spring 44, the tabs 46 will expand outwardly under the general biasing of the spring 44. When the axle shaft 10 is fully installed and is initially rotated, the force of spring 44 will insure that the tabs 46 are engaged with the splined area 54 where it will be there maintained throughout operation. Similarly, if the axle shaft 10 is removed for maintenance reasons, the spring 44 will be expanded to allow axial movement. The axle shaft 10 can then be reinstalled with the spring again being automatically engaged for operation.

As seen in FIG. 4, an alternative wheel speed sensor 58 includes a sensing device 4 like that of the previous embodiment and a rotor 60. However, the rotor 60 has been mounted on an extension 62 of the differential casing 64 for rotation thereabout. The rotor 60 includes a circumferential groove 66 in its internal bearing surface 68 and the extension 62 includes a groove 70 aligned with the groove 66 in its surface 72. The grooves 66 and 70 cooperate to allow a snap ring 74 to be positioned therein for retention of the rotor 60 on the extension 62.

The rotor 60 includes driving means similar to that discussed hereinabove and has an inwardly extending collar portion 76 which closely encircles the spline area 54 of the axle shaft 10 for this purpose. The collar 76 includes a pair of openings 78 and another opening (not shown) which are adapted to respectively receive the tabs 46 and the indented portion 56 of a C-spring 44 which has been explained above. The rotor 60 of the wheel speed sensor 58 therefore will rotate relative to the differential casing in a manner similar to the rotor 6 of the preferred embodiment without the need of a sleeve member 26.

As seen in FIG. 5, another alternative sensor 80 includes a sensing device 4 and a rotor 82. Like the embodiment of FIG. 4, the rotor 82 is mounted on an extended portion 84 of the differential casing 86. Retention of the extended portion 84 is again provided by a snap ring 87 acting on grooves 88 and 90 of the rotor 82 and extended portion 84, respectively. However, to provide the flexible drive means between the rotor 82 and the axle shaft 10, a spring drive 92 is utilized.

As better seen in FIGS. 6 and 7 of the rotor 82 and the spring drive 92, respectively, as viewed from the right in FIG. 5, they cooperate to insure that the rotor 82 will again respond to rotational movement of the axle shaft 10. The rotor 82 again includes a plurality of teeth at its outer circumference but additionally has three evenly spaced cavities 94 about its interior circumference 102. Each cavity 94 is adapted to receive a leg 96 extending inwardly from a base plate 98 of the spring drive 92. Each leg 96 includes a foot 100 which extends into the groove 88 so that the rotor 82 will be firmly held between the base plate 98 and the foot 100. The location of the leg 96 is outwardly of the interior circumference 102 of the rotor 92 to prevent its interference with rotation about the extended portion 84. The spring drive 92 also includes three evenly spaced cantilever spring members 104 which extend inwardly from the base plate 98 at an angle to facilitate installation of the axle shaft 10. Each spring member 104 includes a stamped and formed dimple 106 for engagement with the splined area 54 to prevent relative rotational movement of the spring drive 92 with respect to the axle shaft 10.

Still another embodiment of the invention is shown by the sensor 110 in FIG. 8. Like the embodiments of FIG. 4 and FIG. 5, a rotor 112 is adapted for rotation about an extended portion 114 of the differential casing 116. However, the rotor 112 is retained on the extended portion 114 and is driven about the axle shaft 10 by the same retaining and drive member 118. The rotor 112 again includes equally spaced cavities 120 about its interior circumference 122. As better seen in FIG. 9, the retaining and drive member 118 again includes a base plate 124 to abut the outward end of the rotor 112. A curved leg portion 126 extends from the base plate 124 along the cavity 120 toward the inward end of the rotor 112. An extended end 128 of the leg portion 126 curves inwardly to be received within a circumference groove 130 of the extended portion 114 of the differential casing 116. With the curved leg portion 126 so positioned, the rotor 112 is prevented from being axially removed from the extended portion 114 as it is entrapped between the base plate 124 and the differential casing 116. The curved leg portion 126 within the cavity 120 also insures relative rotation of the rotor 112 with respect to the extended portion 114 without any interference therebetween. An inwardly extended cantilever spring member 132 similar to the spring member 104 is again utilized to insure that the retaining and driving member 118 will rotate in response to axle shaft movement.

Although, in the embodiments discussed hereinabove, rotation of a rotor has been obtained by its being mounted on or relative to the differential casing, an alternative sensor 140 shown in FIG. 10 discloses another means for mounting a rotor 142. The rotor 142 is mounted for rotation about an extended portion 144 of an adjusting nut 146. Retention of the rotor 142 on the extended portion 144 of an adjusting nut 146. Retention of the rotor 142 on the extended portion 144 and rotary driving of the rotor 142 are accomplished with a snap ring 87 and a spring drive 92, respectively, as were discussed hereinabove in the embodiment of FIG. 5. The sensor 140 is not generally preferred to those discussed hereinabove because of the relative rotational movement that will exist during operation between the rotor 142 and the extended portion 144. The adjusting nut 146 will be fixed to prevent its rotation while the rotor 142 will follow the movement of the axle shaft 10. Although in the sensor 140 the relative movements are considered to be significantly greater, the general bearing surface between the extended portion 144 and the rotor 142 is similar since it is felt that sufficient lubrication exists within the housing 18 to prevent its failure and that the spring drive 92 operates in a manner to prevent any significant transverse loads being transmitted from the axle shaft 10. However, it should be obvious from this and other embodiments presented hereinabove that a small bearing means such as a plurality of needle bearings might be utilized to further insure satisfactory free rotation of the rotor 142 throughout operation.

As seen in FIGS. 11 and 12, a final alternative embodiment of the invention is shown in the form of wheel speed sensor 150. The wheel speed sensor 150 includes a housing 152 adapted to be bolted to the interior of the drive axle housing 154. A device 4 which is again mounted for extension through the drive axle housing 154 now also extends into the sensor housing 152. The sensor housing 152 includes for installation of a rotor 160 a cover plate 156. As seen in FIG. 11, with the cover plate 156 installed by a bolt means 158, the rotor 160 of the sensor 150 is also retained within the sensor housing 152 for accurate rotation relative to the sensing device 4. The rotor 160 includes an inwardly extending collar 162 to facilitate its coupling to the axle shaft 10. The collar 162 includes a pair of openings 164 and an opening 172 therethrough to respectively receive the legs 166 and the indented portion 170 of a C-shaped spring 168 similar to that found in the embodiments of FIG. 1 and FIG. 4 for engagement with a splined area of the axle shaft 10.

Although the sensor 150, like those presented hereinabove, is again located in the differential mechanism, it can now be seen that a sensor may be provided in accordance with the present invention which might be located at almost any position along the drive axle housing. It should also be clear that other drive means might be utilized and that other housing designs could be employed to respectively insure that the rotor will rotate in response to axle shaft movement and that the rotor will be maintained within a fixed distance of the sensing device.

Although the entire discussion provided hereinabove has included repeated references to a drive axle, this embodiment provides adequate structure to demonstrate that a sensor of the present invention might be utilized on other axle configurations. If, for example, there exists an axle, with or without a differential mechanism, in which the wheel is rigidly mounted to an axle shaft which extends inwardly therefrom and rotates therewith, a sensor such as shown in FIGS. 11 and 12 may be adapted to provide wheel speed indication. It could then be mounted on the housing or frame inwardly of the wheel in alignment with the axle shaft so that it would be advantageously positioned to allow wheel and axle maintenance without being exposed to damage.

As another point of consideration, it should be noted that each of the embodiments presented hereinabove includes a drive means, in some form or another, which is flexible. This is the preferred configuration to simplify installation of the axle shaft and to more readily accommodate any axle shaft misalignment, one of the primary problems which the present invention is intended to satisfy. It should be recognized that one skilled in the art might devise a number of alternative flexible drive means while still falling within the scope of the invention. However, it is also possible that such a means which is not flexible could also be employed and be within the scope of the invention. For example, the axle shaft could be provided an encircling array of outwardly extending teeth and the rotor could be provided a matching array of inwardly extending teeth. The teeth would not be closely mating but would be deliberately designed to "float" with respect to each other to prevent the transverse motion of the axle shaft from passing to the rotor. The teeth would simply be designed long enough to insure some contact between the two arrays throughout axle shaft rotation to transfer its rotary motion to the rotor.

A flexible drive means would also not be required if the sensor were located along the axle shaft at a position which was not misaligned with the housing during its rotation. The present invention also teaches that a rotor may be mounted at a location other than permanently and directly on the axle shaft to allow it to be readily engaged and disengaged from the shaft and to thereby allow a larger sized rotor and/or one that is less likely to interfere with wheel or axle maintenance. Without a misaligned axle shaft, the invention still provides an advantage over the configurations heretofore utilized and could, for example, be practiced within the scope of the claims by providing a rigid drive means such as the matching arrays of teeth discussed above. However, the teeth could, in this case, also be designed to closely mate if there is no longer a need to compensate to transverse movement of the axle shaft. This configuration would still solve some of the problems presented hereinabove with respect to the prior art since the rotor would be retained within the housing by being mounted to restrict its axial movement within the housing to thereby prevent its removal as the axle shaft is being removed.

I claim:

1. An anti-wheel lock brake control system for controlling the brakes of a pair of wheels mounted on the ends of a drive axle of a vehicle, said drive axle including a housing and a pair of axle shafts and a differential mechanism therein for operationally rotating each said axle shaft which is respectively associated with one of said wheels, said axle shafts being joined to said differential mechanism in a manner which allows movement thereof during said rotating which is transverse with respect to said housing, said system comprising:

a valve capable of delivering operating air pressure to said both brakes;

a computer capable of receiving an input voltage signal for controlling said valve by issuing commands thereto to cause said valve to deliver a proportional amount of said operating air pressure to said both brakes for preventing either of said wheels from locking;

a wheel speed sensor mounted on said drive axle at each side of said differential mechanism inwardly of each said wheel in alignment with its corresponding said axle shaft;

said wheel speed sensor including an electromagnetic sensing device, an excitor rotor and means for maintaining within predetermined limits a predetermined distance therebetween during rotational and transverse movement of said axle shaft;

said excitor rotor being mounted for rotation in response to said rotational movement of its respective said axle shaft without responding to said transverse movement thereof; and said electromagnetic sensing device being aligned with said excitor rotor for sensing its said rotation and providing said input voltage signal to said computer which is unaffected by said transverse movement of said axle shaft and thus indicative of the speed of its respective said wheel.

2. An anti-wheel lock brake control system as set forth in claim 1 wherein said wheel speed sensor is mounted on said drive axle adjacent said differential mechanism.

3. An anti-wheel lock brake control system as set forth in claim 2 wherein said commands from said computer to said valve may vary at a rate of as much as about 50 per second.

4. An anti-wheel lock brake control system as set forth in claim 2 wherein said excitor rotor is mounted on an end of a differential casing of said differential mechanism.

* * * * *